(12) United States Patent
Fileccia (10) Patent No.: US 12,014,237 B2
(45) Date of Patent: Jun. 18, 2024

(54) NEAR-FIELD COMMUNICATION ANTI-COUNTERFEIT SYSTEM AND METHOD

(71) Applicant: Invisible Art, LLC, Nashville, TN (US)

(72) Inventor: Andantino Frank Joel Fileccia, Nashville, TN (US)

(73) Assignee: Invisible Art, LLC, Nashville, TN (US)

( * ) Notice: Subject to any disclaimer, the term of this patent is extended or adjusted under 35 U.S.C. 154(b) by 46 days.

(21) Appl. No.: 17/983,298

(22) Filed: Nov. 8, 2022

(65) Prior Publication Data

US 2023/0147221 A1 May 11, 2023

Related U.S. Application Data (60) Provisional application No. 63/277,674, filed on Nov. 10, 2021.

(51) Int. Cl.
| G06K 19/077 | (2006.01) |
| G06K 19/06 | (2006.01) |
| H04L 9/06 | (2006.01) |

(52) U.S. Cl.
CPC . *G06K 19/07758* (2013.01); *G06K 19/06037* (2013.01); *H04L 9/0631* (2013.01); *H04L 9/0643* (2013.01)

(58) Field of Classification Search
CPC ........ G06K 19/07758; G06K 19/06037; H04L 9/0631; H04L 9/0643
See application file for complete search history.

(56) References Cited

U.S. PATENT DOCUMENTS

| 2015/0134552 | A1* | 5/2015 | Engels | G06Q 10/087 705/318 |
| 2015/0356278 | A1* | 12/2015 | Britt, Jr. | G11B 20/00862 726/28 |
| 2018/0205714 | A1* | 7/2018 | Rosati | H04L 63/0428 |
| 2018/0211305 | A1* | 7/2018 | Baxter | G06Q 30/08 |
| 2021/0103938 | A1* | 4/2021 | Bulawski | H04L 63/0853 |

\* cited by examiner

*Primary Examiner* — Curtis A Kuntz
*Assistant Examiner* — James E Munion
(74) *Attorney, Agent, or Firm* — Fresh IP PLC; John R. Bednarz (57) ABSTRACT

A system includes a memory storing computer-readable instructions and at least one processor to execute the instructions to receive from a client computing device a first unique identifier that was obtained by scanning a near field communication (NFC) tag associated with an item, receive from the client computing device a second unique identifier that was obtained by scanning a quick response (QR) code using an imaging device, compare the first unique identifier with the second unique identifier, and associate the item with a particular user account when the first unique identifier matches the second unique identifier.

21 Claims, 3 Drawing Sheets

NEAR-FIELD COMMUNICATION ANTI-COUNTERFEIT SYSTEM AND METHOD

CROSS-REFERENCE TO RELATED APPLICATION

This application is related to and claims priority under 35 U.S.C. § 119(e) to U.S. Patent Application No. 63/277,674, filed Nov. 10, 2021, entitled "Near-Field Communication Anti-Counterfeit System and Method," the entire contents of which are incorporated herein by reference.

BACKGROUND

Currently, retailers including brick and mortar stores as well as online retailers have issues associated with theft of products and confirming actual owners and purchasers of products and items. The retailers have to pass on associated costs to customers. As an example, if a brand's product is on display at a retail store, it is difficult for the brand to prevent counterfeit sales of their products and ensure that an owner verifies possession of the product.

As another example, products that are sold with digital content and unlocked by a redeemable code within the packaging are difficult to identify as redeemed while on the shelf and only have one factor of authentication. Customers may mistakenly buy the product and lose the digital benefits of owning the product because another user fraudulently redeemed its digital content by redeeming the code.

It is with these issues in mind, among others, that various aspects of the disclosure were conceived.

SUMMARY

The present disclosure is directed to a near-field communication (NFC) anti-counterfeit system and method. A system may include a client computing device that communicates with a server computing device to authenticate a purchase of a product or item. In one example, the client computing device may scan an NFC tag that may be embedded within the product or is associated with the product in another way. The client computing device may send a communication to the server computing device that may include information such as a representation of a first unique identifier that is obtained by scanning the tag. The unique identifier may be encrypted in the tag. The server computing device may send a graphical user interface to the client computing device that requests additional information associated with a second unique identifier.

The client computing device may obtain the second unique identifier by obtaining an image of a quick response (QR) code that may be found on packaging or is otherwise associated with the product using one or more imaging devices. The client computing device may send a second communication to the server computing device that may include information such as a representation of the second identifier associated with the QR code. The server computing device may compare the first unique identifier with the second unique identifier to determine whether they match. If the first unique identifier matches the second unique identifier, the server computing device may store an association between a user profile or user account and the product in a database. The server computing device may send a communication to the client computing device that allows the client computing device to display information on the graphical user interface associated with the association between the user profile or user account and the product.

In one example, a system may include a memory storing computer-readable instructions and at least one processor to execute the instructions to receive from a client computing device a first unique identifier that was obtained by scanning a near field communication (NFC) tag associated with an item, receive from the client computing device a second unique identifier that was obtained by scanning a quick response (QR) code using an imaging device, compare the first unique identifier with the second unique identifier, and associate the item with a particular user account when the first unique identifier matches the second unique identifier.

In another example, a method may include receiving, by at least one processor, from a client computing device, a first unique identifier that was obtained by scanning a near field communication (NFC) tag associated with an item, receiving, by the at least one processor, from the client computing device, a second unique identifier that was obtained by scanning a quick response (QR) code using an imaging device, comparing, by the at least one processor, the first unique identifier with the second unique identifier, and associating, by the at least one processor, the item with a particular user account when the first unique identifier matches the second unique identifier.

In another example, a mobile computing device may have at least one processor to scan a near field communication (NFC) tag associated with an item to obtain a first unique identifier, use at least one imaging device to capture a quick response (QR) code to obtain a second unique identifier, transmit the first unique identifier and the second unique identifier to a server computing device, and transmit information associated with a particular user account to the server computing device to have the server computing device store an association between the particular user account and the item when the first unique identifier matches the second unique identifier.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a system and method for NFC anti-counterfeit includes a client computing device that communicates with a server computing device to authenticate a purchase of a product or item. In one example, the client computing device may scan an NFC tag that may be embedded within the product or associated with the product in another way. The client computing device may send a communication to the server computing device that may include information such as a representation of a first unique identifier that is obtained by scanning the tag. The unique identifier may be encrypted in the tag. The server computing device may execute an anti-counterfeit application and may send a graphical user interface to the client computing device that requests additional information associated with a second unique identifier.

The client computing device may obtain the second unique identifier by obtaining an image of a quick response (QR) code that may be found on packaging or otherwise is associated with the product using one or more imaging devices. The client computing device may send a second communication to the server computing device that may include information such as a representation of the second unique identifier associated with the QR code. The server computing device may compare the first unique identifier with the second unique identifier to determine whether they match. If the first unique identifier matches the second unique identifier, the server computing device may store an association between a user profile or user account and the product in a database. The server computing device may send a communication to the client computing device that allows the client computing device to display information on the graphical user interface such as information related to the user profile or user account and the product.

Product anti-counterfeiting is a problem that has cost companies over 26 billion US Dollars in the clothing industry alone. Fortunately there are high tech solutions such as NXP's NTAG 424 DNA tags. These next-generation NFC tags are able to generate unique ciphertext by encrypting and/or signing messages that change on every read. The ciphertext and/or signature is then passed to an NFC capable device (typically the customer's smartphone) where the message can be sent to a server that can cryptographically verify the ciphertext and/or signature's authenticity. The ciphertext may also contain tag/product specific information such as unique identifiers or data gathered from sensors.

This provides a possible solution for product anti-counterfeiting, but does not allow a user or customer to register the product to an associated account, while also validating ownership in the process. The tags alone may not be secure enough because the products may be sold on the shelves of physical stores or during live events. In that case, all an attacker would have to do is walk by the product and tap the product with their phone or another computing device in order for the product to be registered to their digital account. The system herein provides product registration by which a user would need the authentic physical product present, and also "proof of purchase".

This can be accomplished by including a "proof of purchase" code within the product's packaging, or by providing a "proof of purchase" code to the customer during the checkout process. This code would contain cryptographically significant information and/or information used to identify a specific "proof of authenticity" NFC tag after some cryptographic function(s). That way, "proof of authenticity" NFC technology can be used in combination with this "proof of purchase" technology in order to securely verify ownership of a product.

The system provides a robust way for verifying the real owner of the product, identifying the person who fraudulently redeemed the QR code, and quickly ensuring the digital content is in the hands of the true owner. If the QR code is available to the true owner after being fraudulently redeemed, it can still be used to verify the true owner because the product may have to be available to complete the full process. Once the true owner redeems the digital content, the QR code can be destroyed.

In one example, a product or item may have a unique identifier stored within product packaging or somewhere that is hidden or not visible while on display at a retail store. This unique identifier may be used to attach or associate user account information to NFC authenticated products. Conventional solutions such as gift card codes or scratch off codes may come with products but they are not used to associate the product with a user or purchaser.

If an NFC authenticated product is on display at a retail store, there is currently not a way to attach or associate the product to a user account. Some businesses may wish to sell their products to retailers who would be responsible for verifying product ownership and manually specifying owners of their products. As an example, an item such as designer shoes may have an associated NFC tag as well as a hidden or "locked away" code such as a quick response (QR) code. Alternatively, the item may have raw text or another way to prove ownership of the item or product. As an example, the product may come with a scratch off code that may identify the NFC tag and/or the QR code that can only be accessed deep within packaging associated with the product. This may allow a retailer to provide customers with anti-theft options, bundling discounts, better customer support, access to digital content, and an overall enhanced user experience without having to sell directly to the customer.

In one example, the item or product may include an NFC tag that may be an NTAG 424 DNA tag and may in combination have a separately printed code to verify ownership. Current systems may rely on one or the other. Although the NFC tag may be used to verify if a product is authentic, it cannot be used to verify a product's owner. A code may be used to attach a product to a user's account. However, without the NFC tag, the product does not have to be physically in the hands of the user, which makes it less secure.

As an example, if a user purchases a product that includes NFC enabled anti-counterfeiting measures, e.g., the NTAG 424 DNA tag, it may generate a unique one time uniform resource locator (URL) each time it is scanned. The NFC tag can be associated or attached with a product and an online user account or profile by reading an associated quick response (QR) code that is sold or otherwise included with the product. The QR code may be hidden while the product is on display at a physical retailer. The secure NFC tag may generate the one time use URL that includes a unique identifier (UID) and a counter that may iterate by one on each read or scan. The UID and counter may be encrypted with a key that is only known to the person or entity that programmed the tag, and the user is only able to see the encrypted string in the URL.

If the tag is valid and the UID can be decrypted, the QR code can be read and tested to determine if it contains the same UID. If the UID from the QR code matches the UID decrypted from the tag, the person who completed the process can be confirmed as the owner of the product or item. The process also can be completed in "reverse." In other words, the user can scan the QR code and read the tag to compare the UIDs including a first UID associated with the QR code and a second UID associated with the tag. The UID associated with the QR code can also be stored in multiple formats such as an encrypted string that uses the same key used to program the tag or a separate identifier that may be used to lookup the tag's UID in a database. Alternatively, the QR code could be substituted in another way. The UID could be retrieved from another NFC tag or could be determined from raw text printed on packaging associated with the product or item. Once a user is identified as an owner of the product, a user profile or user account can be marked or indicated as an owner of a product or item until ownership is transferred to another account or an administrator transfers ownership.

Using the NTAG 424 DNA tag as an example, each NFC Data Exchange Format (NDEF) message may have a unique identifier that is specific to the tag in an encrypted string. This string may be sent to a server computing device and decrypted. Once the string is decrypted, the server computing device may compare the UID from the tag, and the UID from the proof-of-purchase code and make sure that they match before creating a relationship with that tag/product and a user's account. The proof-of-purchase code could also contain the UID of the tag as an encrypted string that would need to be decrypted in order to add additional security.

The NTAG 424 DNA tags can also generate an Advanced Encryption Standard (AES) cipher-based message authentication code (CMAC) message on each read which can be used to validate the tag's authenticity. This function can also be used to generate the "proof of purchase" code. The tag can be used to discover the encryption keys to be used, and then the keys can be used to verify the CMAC message within the "proof of purchase" code. If the CMAC message is valid, then the user can proceed with the registration process.

For tags that generate signatures in the NDEF messages from a private key in an asymmetric key pair instead of encrypted messages to validate a product's authenticity, the "proof of purchase" code may contain a signature that was created when the key pair was first generated. With conventional use of tags, the private key may only exist on the tags after creation. The signature could be created using any information, as long as the signature was generated using the same private key that is used by the tag. This signature generated at creation can be stored in the product's packaging as the "proof of purchase" (typically as a QR code) so that when a user buys the product, the user can use a smartphone or other computing device to read the signatures on both the NFC tag and the "proof of purchase" code. If both signatures are valid, then it is appropriate to proceed with registration.

Figure 1:
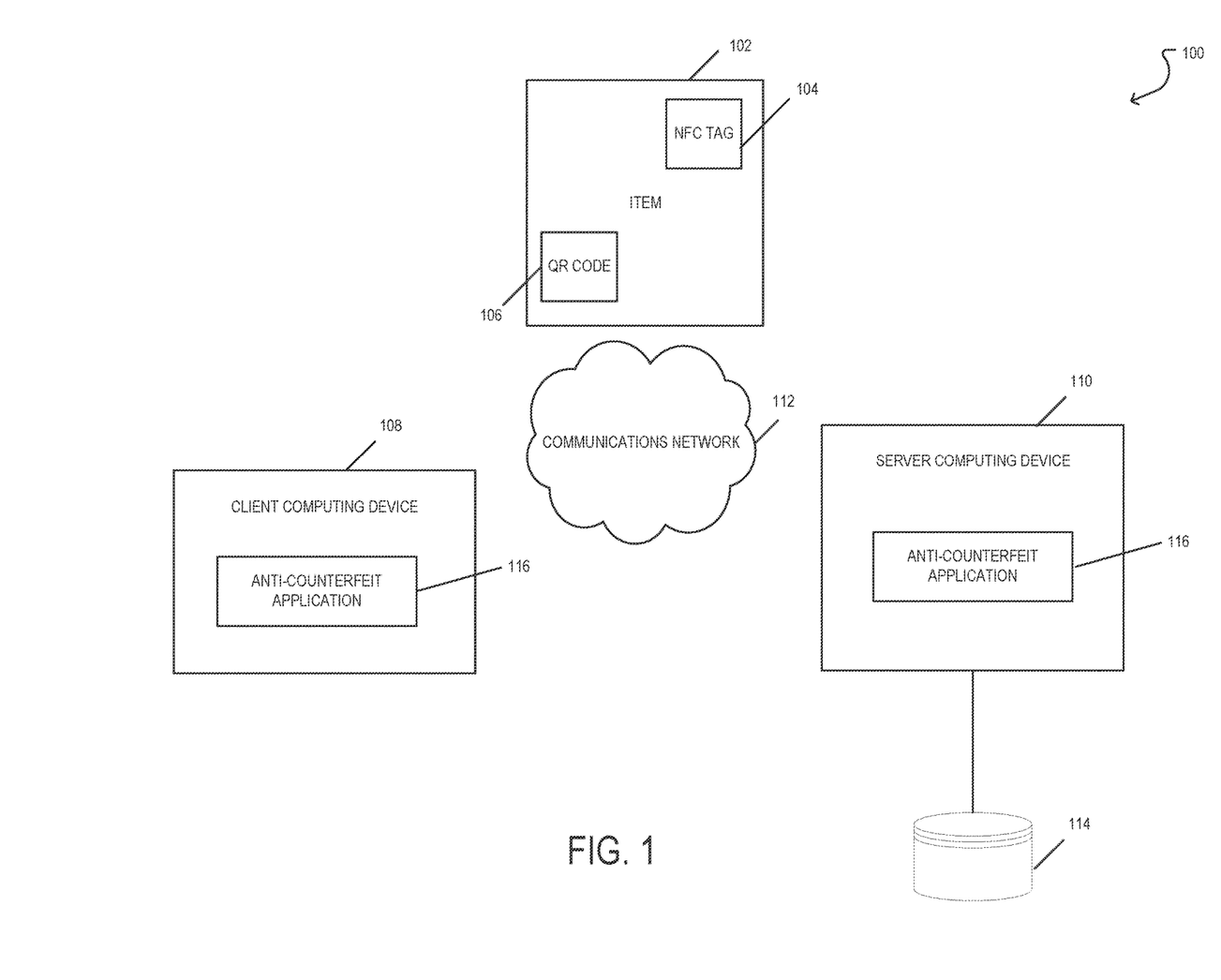
FIG. 1 is a block diagram of a near field communication (NFC) anti-counterfeit system according to an example of the instant disclosure.

FIG. 1 is a block diagram of an NFC anti-counterfeit system 100 according to an example of the instant disclosure. As shown in FIG. 1, the system 100 may include a plurality of items or products 102 such as designer shoes, shirts, purses, jewelry, toys, collectable items such as baseball cards or trading cards, vehicle parts, artwork, computer hardware, and liquor bottles, among others. Each item 102 may have an NFC tag 104 that may be embedded within or somehow associated with the item. In addition, each item 102 may have a quick response (QR) code 106 that may be associated with the item. In one example, the QR code 106 may be on packaging associated with the item 102. The system 100 may further include at least one client computing device 108 and at least one server computing device 110. The at least one server computing device 110 may be in communication with at least one database 114.

The client computing device 108 and the server computing device 110 may have an anti-counterfeit application 116 that may be a component of an application and/or service executable by the at least one client computing device 108 and/or the server computing device 110. For example, the anti-counterfeit application 116 may be a single unit of deployable executable code or a plurality of units of deployable executable code. According to one aspect, the anti-counterfeit application 116 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The anti-counterfeit system 100 also may include a relational database management system (RDBMS) or another type of database management system such as a NoSQL database system that stores and communicates data from at least one database 114. The data stored in the at least one database 114 may be associated with the plurality of items 102 and ownership information associated with the plurality of items 102 including user account or profile information associated with a plurality of users. Each item 102 may have an associated owner and/or purchaser and be associated with a particular user account. As an example, the database 114 may include one or more tables or data such as a table associated with the tags, a table associated with the QR codes, and a table associated with the products, among others.

The at least one client computing device 108 and the at least one server computing device 110 may be configured to receive data from and/or transmit data through a communication network 112. Although the client computing device 108 and the server computing device 110 are shown as a single computing device, it is contemplated each computing device may include multiple computing devices.

The communication network 112 can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 108 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 108 further includes at least one communications interface to transmit and receive communications, messages, and/or signals.

The client computing device 108 could be a programmable logic controller, a programmable controller, a laptop computer, a smartphone, a personal digital assistant, a tablet computer, a standard personal computer, or another processing device. The client computing device 108 may include a display, such as a computer monitor, for displaying data and/or graphical user interfaces. The client computing device 108 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 110 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 110 further includes at least one communications interface to transmit and receive communications, messages, and/or signals.

Figure 2:
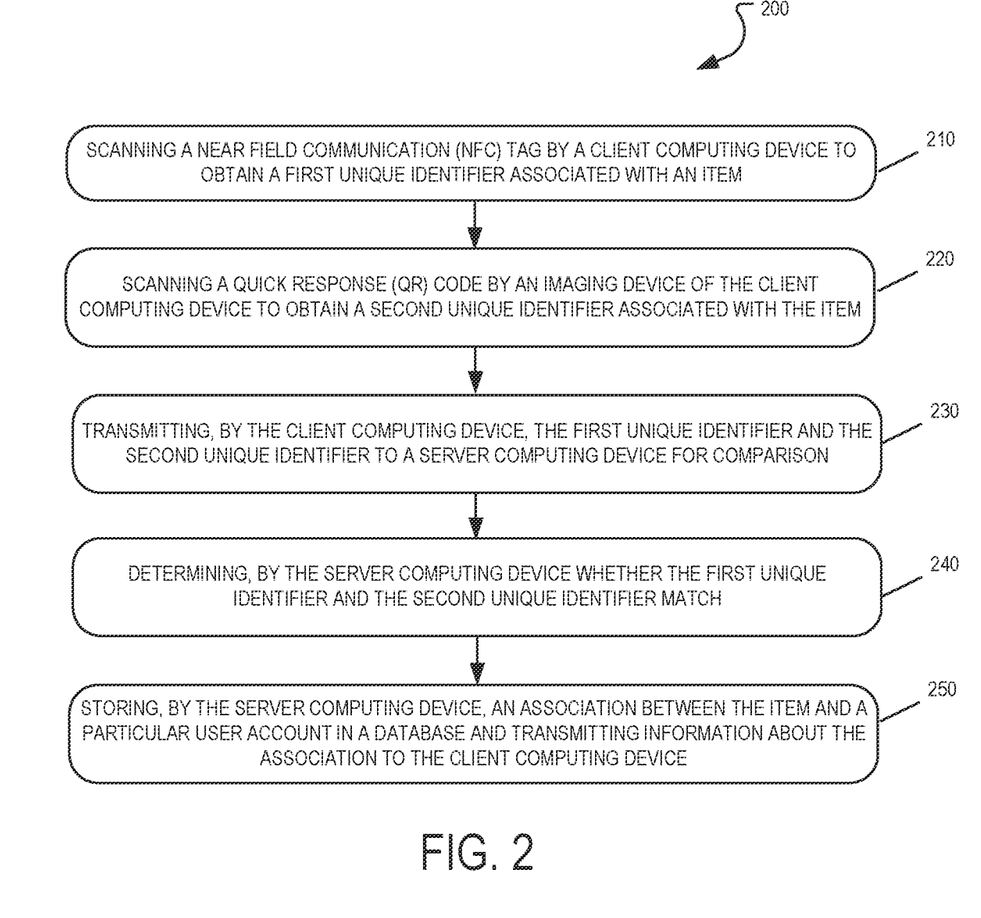
FIG. 2 is a flowchart of a method of associating an item with a particular user account according to an example of the instant disclosure.

FIG. 2 illustrates an example method 200 of associating an item with a particular user account according to an example of the instant disclosure. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 may include scanning the near-field communication (NFC) tag 104 by the client computing device 108 to obtain a first unique identifier associated with the item 102 at block 210. The item may be an item of clothing or another product such as designer shoes, shirts, purses, jewelry, toys, collectable items such as baseball cards or trading cards, vehicle parts, artwork, computer hardware, and liquor bottles, among others. In addition, the NFC tag 104 may be an NTAG 424 DNA tag, among other types of tags.

Next, according to some examples, the method 200 may include scanning a quick response (QR) code 106 by an imaging device, e.g., one or more cameras, of the client computing device 108 to obtain a second unique identifier associated with the item 102 at block 220. The second unique identifier may be on product packaging associated with the item 102.

Next, according to some examples, the method 200 may include transmitting the first unique identifier and the second unique identifier from the client computing device 108 to the server computing device 110 at block 230.

Next, according to some examples, the method 200 may include, determining by the server computing device 110 whether the first unique identifier and the second unique identifier match at block 240.

Next, according to some examples, the method 200 may include, storing by the server computing device 110, an association between the item 102 and a particular user account in the database 114 when the first unique identifier and the second unique identifier match and transmitting information about the association to the client computing device 108 at block 250.

In some examples, the method 200 may include generating a one time uniform resource locator (URL) having the first unique identifier and iterating a counter by one. In some other examples, at least one of the first unique identifier and the second unique identifier may be encrypted and/or at least one of the first unique identifier and the second unique identifier may be decrypted.

In some examples, the method 200 may include transferring ownership of the item from the particular user account to a different user account.

In some examples, the method 200 may include obtaining the first unique identifier from an NFC Data Exchange Format (NDEF) message in an encrypted string by scanning the NFC tag associated with the item.

In some examples, the method 200 may include, obtaining the first unique identifier by generating an Advanced Encryption Standard (AES) cipher-based message authentication code (CMAC). As an example, the tag can be used to discover the encryption keys to be used, and then the keys can be used to verify the CMAC message within the "proof of purchase" code. If the CMAC message is valid, then the user can proceed with the registration process.

As an example, a product 102 being sold may be a pair of shoes by brand SuperExpensiveFancyShoo. The shoes may have an NFC tag 104 embedded into a side of one or more of the shoes and a QR code 106 may be included in the shoe box or in another location. The NFC tag 104 may have a UID of ABCD1234. The QR code 106 may contain the UID of (ABCD1234).

The user may scan or tap the NFC tag 104 on the shoe 102 using their client computing device 108 and the client computing device 108 may send a request to the server computing device 110. The server computing device 110 may respond and provide a GUI using the anti-counterfeit application 116. The client computing device 110 may display a native interface and/or a web interface associated with the anti-counterfeit application 116 using a browser and there may be one or more user interface elements that request that the user scan the QR code 106 to verify ownership of the shoes.

The user may scan the QR code 106 using the imaging device of the client computing device 108. This will determine whether the UID embedded within the QR code 106 is the same as the UID from the tag's encrypted string. If the UIDs match, the user's account may be marked as the product owner. If the UIDs do not match, there may be an error recorded and displayed on the client computing device 108. In addition, the seller of the product may be notified of a potential fraudulent purchase.

Example pseudocode is shown below including functionality associated with the anti-counterfeit application 116 executed by the server computing device 110 and/or the client computing device 108. The server computing device 110 may be used to link a user's account and execute verification of tags. The server computing device 110 may execute one or more functions associated with the anti-counterfeit application 116 and send a graphical user interface (GUI) to the client computing device 108 for display on the client computing device. As an example, the GUI may be provided by the anti-counterfeit application 116 and allow the user of the client computing device 108 to verify authenticity or initiate the registration process (e.g., scan a QR code).

The example code below is associated with general tag verification.

```
Router.get( '/verifyAuthenticity', ( request, response ) => {
  // Get tag keys, counter, and other data by ID
  const tag = Tag.getById( request.query.tagId );
  if ( !tag ) {
    response.send('Invalid tag');
    return;
  }
  // Decrypt the tag and retrieve the UID/Counter from the encrypted message
  const { uid, counter } = tag.verify( request.query.enc, request.query.cmac );
  // Check if the counter is the most recent (and the url hasn't already been used)
  if ( counter <= tag.lastCounter ) {
    response.send('This URL has already been used.');
  // Make sure the decrypted UID and stored UID match
  } else if ( uid !== tag.uid ) {
    response.send('This tag is inauthentic.');
  } else {
    response.send('This tag is authentic!')
  }
});
```

The example code below is associated with attaching a product to an account using a tag's unique identifier within the QR code.

```
// Attach product to account using a QR Code containing the raw text uid
// The qr code data is stored in the body variable "registrationData"
Router.put( '/attachProductToAccount', requireUserAuthMiddleware, ( req, res ) =>{
  // The tagId, enc, cmac, and registrationData will need to be provided in this request
    const tag = Tag.getById( req.body.tagId );
    const { uid, counter } = tag.verify( req.body.enc, req.body.cmac );
    // ...verify tag information and proceed if valid
    const user = User.fromToken( req.user); // Get user data from provided JWT data
    const product = Tag.getProduct( ); // Get the product information associated with
  the tag
    // Test if the uid matches the qr code data
    if ( uid === req.body.registrationData ) {
      user.addProduct( product); // Add the product to the user's digital closet
      res.send('Successfully added the product to your account!')
    } else {
      res.send('Unvalid Registration Code');
    }
});
```

The example code shown below is associated with attaching a product to an account using an encrypted unique identifier stored within the QR code. The encrypted registration code can be decrypted with the same key that is used to generate encrypted data on the tag.

```
// Attach product to account using an encrypted string
// programmed in the QR Code
Router.put( '/attachProductToAccountEncrypted',
requireUserAuthMiddleware, ( req, res ) => {
    // The tagId, enc, cmac, and registrationData will need to be provided
in this request
    const tag = Tag.getById( req.body.tagId );
    const { uid, counter } = tag.verify( req.body.enc, req.body.cmac );
    // ...verify tag information and proceed if valid
    const user = User.fromToken( req.user ); // Get user data from
    provided JWT data
    const product = Tag.getProduct( );
    // Get the product information associated with the tag
    // Decrypt the QR code's data using the tag's encryption keys
    const decryptedRegistrationData = Tag.decrypt(
    req.body.registrationData );
    // Test if the uid matches the qr code data
    if ( uid === decryptedRegistrationData ) {
        user.addProduct( product ); // Add the product to the user's digital
        closet
        res.send('Successfully added the product to your account!')
    } else {
        res.send('Invalid QR Code');
    }
});
```

The example code shown below is associated with attaching products to one or more user accounts using a unique identifier stored in the QR code that may have a relationship to a specific tag, but is not the same identifier used to identify the tag.

```
// Attach product to account using a separate unique registration code
ID
// In this scenario, the registrationData would contain a unique ID that
// has a one to one relationship with both the Tags & Products table
Router.put( '/attachProductToAccountUniqueReg',
requireUserAuthMiddleware, ( req, res ) => {
    // Verify the registration code first and then verify that the tag is
    authentic
    // Lookup the stored productId and tagID by the unique registration
    ID
    const { productId, tagId } = RegistrationCodes.infoByCode(
req.body.registrationCode );
    // Verify that the tag ID associated with the registration code is
    // the same as the tag being scanned (the enc data will still need to be
    verified)
    if ( tagId !== req.body.tagId ) {
        res.send('Invalid tag');
        return;
    }
    const tag = Tag.byId( tagId );
    const product = Product.byId( productId );
    const { uid, counter } = tag.verify( req.body.enc, req.body.cmac );
    // ...verify tag information and proceed if valid
    const user = User.fromToken( req.user );
    user.addProduct( product );
    res.send('Successfully added the product to your account!')
});
module.exports = Router;
```

The example pseudocode below may be used to attach products to user accounts using a unique ID that can be stored in a table that has a foreign key relationship with the table that stores tag information.

```
// Attach a product to a user account using a separate unique registration
code
// In this example, there would be a "Registration Codes" table, which
would
// have 3 columns: (uniqueQRCode, tagId, productId). The code below
would look for
// the row that contains the uniqueQRCode so that the associated tag
and product
// can be identified
Router.put( '/attachProductToAccountUniqueReg',
requireUserAuthMiddleware, catchErr( async ( req, res ) => {
    // Validate the registration code input first and then verify that the tag
    is authentic
    // Lookup the stored productId and tagID by the unique registration
    code
    // SQL: SELECT productId, tagId FROM RegistrationCodes WHERE
uniqueQRCode = @ registrationCode
    const { productId, tagId } = await RegistrationCodes.infoByCode(
req.body .registrationCode );
    // Verify that the tag ID associated with the registration code is
    // the same as the tag being scanned (the enc data will still need to be
    verified)
    if ( tagId !== tagIdInput ) {
        res.send('Invalid tag');
        return;
    }
    const tag = await Tag.byId( tagId );
    const product = await Product.byId( productId );
    // verify tag information and proceed if valid
    // This function will throw an exception if the tag is inauthentic and
verification fails.
    const { uid, counter } = await tag.verify( encInput, cmacInput);
    const user = await User.fromToken( req.user );
    await user.addProduct( product );
    res.send('Successfully added the product to your account!')
}));
Router.get( '/verifyAuthenticity', ( req, res ) => {
    // The tag's encrypted string would be decrypted by the encryption
key stored at the
    // product skew level. This would expose the UID of the tag;
    const { uid, ctr, valid } = ProductSkew.decrypt( req.body.enc );
    if ( ! valid ) {
        res.send('This product is not authentic.');
        return;
    }
    // The decrypted UID is then used to lookup the rest of the tag's
    decryption keys
    const tag = Tag.getByUid( uid );
    if ( ! tag ) {
        res.send('Invalid tag');
        return;
    }
    if ( tag.ctr >= ctr ) {
        res.send('This URL has expired.');
        return;
    }
    // A key stored at the tag specific level is then used to validate the
    CMAC.
    // Key 3 is used to verify the cmac
    const cmacValid = tag.verify( req.body.cmac, 3 );
    if ( cmacValid ) {
        res. send('Authentic!')
    } else {
        res.send('Inauthentic')
    }
});
```

The example pseudocode below can be used for tags that use an asymmetric encryption algorithm to verify authenticity. The registration code may be generated as a part of the programming process and then can be stored on a remote server along with a public encryption key.

```
// The key generate would happen on the client's machine, and then the
public
// key would be stored on the server for validation
async function generateAsyncKeysAndRegistrationCode ( ) {
    // Generate key pair
    const { publicKey, privateKey } = crypto.generateKeyPairSync( 'rsa', {
        modulusLength: 2048
    });
    // Program the private key into the physical tag
    await physicalNfcTag.storePrivateKey( privateKey );
    // Generate some random data to sign with the tag's private key before
```

```
  deleting it.
  const nonce = crypto.randomBytes(32);
  // Generate the signed data to be used as the registration code
  const registrationCode = crypto.sign('sha256', Buffer.from( nonce ), {
    key: privateKey,
    padding: crypto.constants.RSA_PKCS1_PSS_PADDING
  });
  // Store the private key & registration code on the remote server so that it can
  // perform validation. If an error occurs, reset the tag
  try {
    const data = await fetch( `${apiUrl}/asyncTag`, {
      method: 'POST',
      body: JSON.stringify({ publicKey, registrationCode })
    });
    const { success, err } = await res.json( );
    if ( ! success ) throw new Error( err );
  } catch ( err ) {
    await physicalNfcTag.deprogram( privateKey );
    console.log( err);
  }
  await destroyLocalTagData( privateKey );
}
```

The registration code and the tab generated signature can be verified by the public key in order for production registration to occur.

```
  // In the case of NFC tags the use asymmetric encryption algorithms, the
  tag-generated
  // signature would need to be validated along with the registration code in order
  // for the product to get registered to the user's account
  Router.put( '/registerProductWAsyncAuthentication', catchErr( async ( req, res ) =>{
    // Look up the tag and corresponding public key by the tag's ID
    const tag = await Tag.byId( tagId );
    // Verify both the tag generated signature, and registration signature in parallel
    const [ tagValid, registrationCodeValid ] = await Promise.all([
      Tag.verifySignature( tagSignatureInput ),
      Tag.verifySignature( registrationCodeInput )
    ]);
    // If the tag generated signature or registration code isn't valid, don't proceed.
    if ( ! tagValid || ! registrationCodeValid ) throw new Error('Unable to complete registration');
    // Find the user's SQL record by their current session and proceed to register
    // the product to their account
    const user = await User.fromToken( req.user );
    await user.addProduct( product );
    res.send( 200 );
  }));
  module.exports = Router;
```

Figure 3:
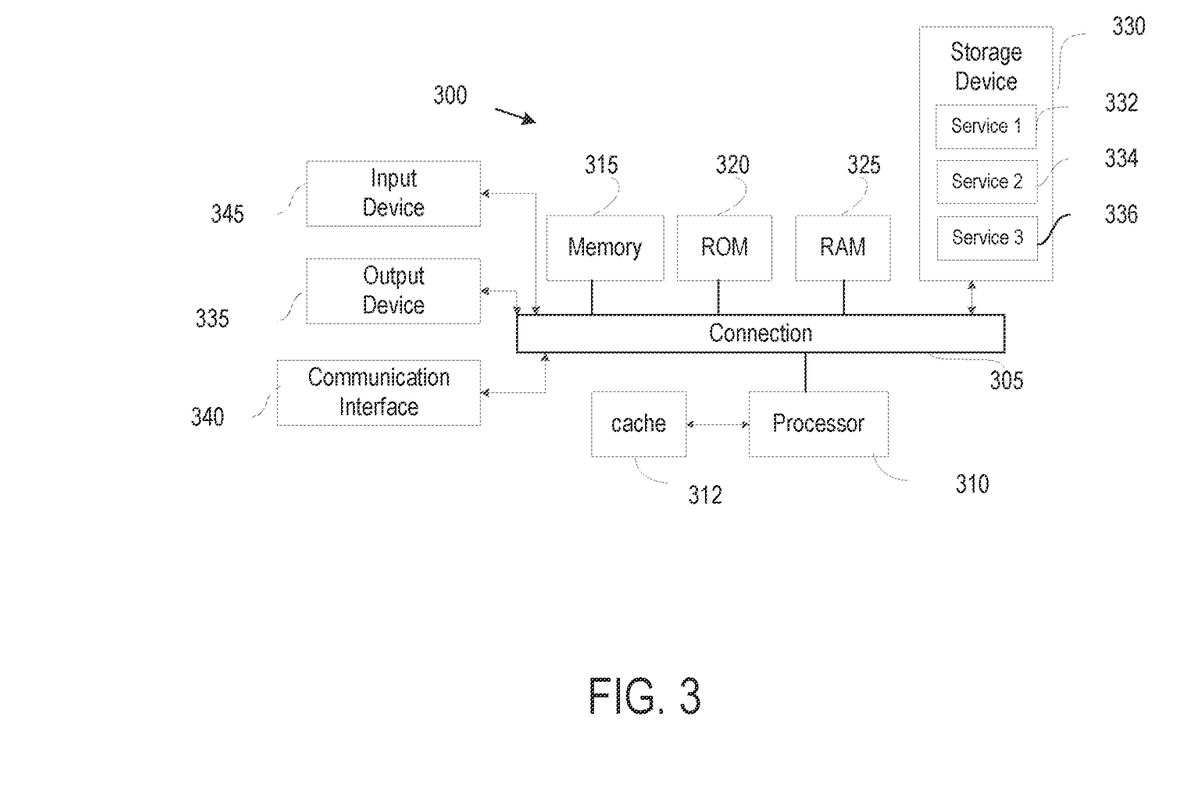
FIG. 3 shows an example of a system for implementing certain aspects of the present technology.

FIG. 3 shows an example of computing system 300, which can be for example any computing device making up the computing device such as the client computing device 108, the server computing device 110, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read-only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions and at least one processor to execute the instructions to receive from a client computing device a first unique identifier that was obtained by scanning a near field communication (NFC) tag associated with an item, receive from the client computing device a second unique identifier that was obtained by scanning a quick response (QR) code using an imaging device, compare the first unique identifier with the second unique identifier, and associate the item with a particular user account when the first unique identifier matches the second unique identifier.

Aspect 2: The system of Aspect 1, the at least one processor further to execute the instructions to generate a one time uniform resource locator (URL) having the first unique identifier and to iterate a counter by one.

Aspect 3: The system of Aspects 1 and 2, wherein the item comprises one of clothing, a purse, jewelry, a toy, a collectable item, a vehicle part, artwork, computer hardware, and a liquor bottle.

Aspect 4: The system of Aspects 1 to 3, wherein the second unique identifier is on product packaging associated with the item.

Aspect 5: The system of Aspects 1 to 4, wherein the NFC tag comprises an NTAG 424 DNA tag.

Aspect 6: The system of Aspects 1 to 5, wherein at least one of the first unique identifier and the second unique identifier are encrypted.

Aspect 7: The system of Aspects 1 to 6, wherein at least one of the first unique identifier and the second unique identifier are decrypted.

Aspect 8: The system of Aspects 1 to 7, the at least one processor further to execute the instructions to transfer ownership of the item from the particular user account to a different user account.

Aspect 9: The system of Aspects 1 to 8, the at least one processor further to obtain the first unique identifier from an NFC Data Exchange Format (NDEF) message in an encrypted string by scanning the NFC tag associated with the item.

Aspect 10: The system of Aspects 1 to 9, wherein the first unique identifier is obtained by generating an Advanced Encryption Standard (AES) cipher-based message authentication code (CMAC).

Aspect 11: A method comprising receiving, by at least one processor, from a client computing device, a first unique identifier that was obtained by scanning a near field communication (NFC) tag associated with an item, receiving, by the at least one processor, from the client computing device, a second unique identifier that was obtained by scanning a quick response (QR) code using an imaging device, comparing, by the at least one processor, the first unique identifier with the second unique identifier, and associating, by the at least one processor, the item with a particular user account when the first unique identifier matches the second unique identifier.

Aspect 12: The method of Aspect 11, further comprising generating a one time uniform resource locator (URL) having the first unique identifier and iterating a counter by one.

Aspect 13: The method of Aspects 11 and 12, wherein the item comprises one of clothing, a purse, jewelry, a toy, a collectable item, a vehicle part, artwork, computer hardware, and a liquor bottle.

Aspect 14: The method of Aspects 11 to 13, wherein the second unique identifier is on product packaging associated with the item.

Aspect 15: The method of Aspects 11 to 14, wherein the NFC tag comprises an NTAG 424 DNA tag.

Aspect 16: The method of Aspects 11 to 15, wherein at least one of the first unique identifier and the second unique identifier are encrypted.

Aspect 17: The method of Aspects 11 to 16, wherein at least one of the first unique identifier and the second unique identifier are decrypted.

Aspect 18: The method of Aspects 11 to 17, further comprising transferring ownership of the item from the particular user account to a different user account.

Aspect 19: The method of Aspects 11 to 18, further comprising obtaining the first unique identifier from an NFC Data Exchange Format (NDEF) message in an encrypted string by scanning the NFC tag associated with the item.

Aspect 20: The method of Aspects 11 to 19, further comprising obtaining the first unique identifier by generating an Advanced Encryption Standard (AES) cipher-based message authentication code (CMAC).

Aspect 21: A mobile computing device having at least one processor to scan a near field communication (NFC) tag associated with an item to obtain a first unique identifier, use at least one imaging device to capture a quick response (QR)

code to obtain a second unique identifier, transmit the first unique identifier and the second unique identifier to a server computing device, and transmit information associated with a particular user account to the server computing device to have the server computing device store an association between the particular user account and the item when the first unique identifier matches the second unique identifier.

Aspect 22: The mobile computing device of Aspect 21, the at least one processor further to generate a one time uniform resource locator (URL) having the first unique identifier and to iterate a counter by one.

Aspect 23: The mobile computing device of Aspects 21 and 22, wherein the item comprises one of clothing, a purse, jewelry, a toy, a collectable item, a vehicle part, artwork, computer hardware, and a liquor bottle.

Aspect 24: The mobile computing device of Aspects 21 to 23, wherein the second unique identifier is on product packaging associated with the item.

Aspect 25: The mobile computing device of Aspects 21 to 24, wherein the NFC tag comprises an NTAG 424 DNA tag.

Aspect 26: The mobile computing device of Aspects 21 to 25, wherein at least one of the first unique identifier and the second unique identifier are encrypted.

Aspect 27: The mobile computing device of Aspects 21 to 26, wherein at least one of the first unique identifier and the second unique identifier are decrypted.

Aspect 28: The mobile computing device of Aspects 21 to 27, the at least one processor further to transfer ownership of the item from the particular user account to a different user account.

Aspect 29: The mobile computing device of Aspects 21 to 28, the at least one processor further to obtain the first unique identifier from an NFC Data Exchange Format (NDEF) message in an encrypted string by scanning the NFC tag associated with the item.

Aspect 30: The mobile computing device of Aspects 21 to 29, the at least one processor further to obtain the first unique identifier by generating an Advanced Encryption Standard (AES) cipher-based message authentication code (CMAC).

What is claimed is:

1. A system comprising:
   a memory storing computer-readable instructions; and
   at least one processor to execute the instructions to:
   receive from a client computing device a first unique identifier that was obtained by scanning a near field communication (NFC) tag associated with an item;
   receive from the client computing device a second unique identifier that was obtained by scanning a quick response (QR) code using an imaging device;
   compare the first unique identifier with the second unique identifier;
   associate the item with a particular user account when the first unique identifier matches the second unique identifier; and
   associate the item with a digital closet associated with the particular user account by obtaining user data associated with the particular user account using JSON Web Token data.

2. The system of claim 1, the at least one processor further to execute the instructions to generate a one time uniform resource locator (URL) having the first unique identifier and to iterate a counter by one.

3. The system of claim 1, wherein the item comprises one of clothing, a purse, jewelry, a toy, a collectable item, a vehicle part, artwork, computer hardware, and a liquor bottle.

4. The system of claim 1, wherein the second unique identifier is on product packaging associated with the item.

5. The system of claim 1, wherein the NFC tag comprises an NTAG 424 DNA tag.

6. The system of claim 1, wherein at least one of the first unique identifier and the second unique identifier are encrypted.

7. The system of claim 1, wherein at least one of the first unique identifier and the second unique identifier are decrypted.

8. The system of claim 1, the at least one processor further to execute the instructions to transfer ownership of the item from the particular user account to a different user account.

9. The system of claim 1, the at least one processor further to obtain the first unique identifier from an NFC Data Exchange Format (NDEF) message in an encrypted string by scanning the NFC tag associated with the item.

10. The system of claim 1, wherein the first unique identifier is obtained by generating an Advanced Encryption Standard (AES) cipher-based message authentication code (CMAC).

11. A method, comprising:
    receiving, by at least one processor, from a client computing device, a first unique identifier that was obtained by scanning a near field communication (NFC) tag associated with an item;
    receiving, by the at least one processor, from the client computing device, a second unique identifier that was obtained by scanning a quick response (QR) code using an imaging device;
    comparing, by the at least one processor, the first unique identifier with the second unique identifier;
    associating, by the at least one processor, the item with a particular user account when the first unique identifier matches the second unique identifier; and
    associating, by the at least one processor, the item with a digital closet associated with the particular user account using JSON Web Token data.

12. The method of claim 11, further comprising generating a one time uniform resource locator (URL) having the first unique identifier and iterating a counter by one.

13. The method of claim 11, wherein the item comprises one of clothing, a purse, jewelry, a toy, a collectable item, a vehicle part, artwork, computer hardware, and a liquor bottle.

14. The method of claim 11, wherein the second unique identifier is on product packaging associated with the item.

15. The method of claim 11, wherein the NFC tag comprises an NTAG 424 DNA tag.

16. The method of claim 11, wherein at least one of the first unique identifier and the second unique identifier are encrypted.

17. The method of claim 11, wherein at least one of the first unique identifier and the second unique identifier are decrypted.

18. The method of claim 11, further comprising transferring ownership of the item from the particular user account to a different user account.

19. The method of claim 11, further comprising obtaining the first unique identifier from an NFC Data Exchange Format (NDEF) message in an encrypted string by scanning the NFC tag associated with the item.

20. The method of claim 11, further comprising obtaining the first unique identifier by generating an Advanced Encryption Standard (AES) cipher-based message authentication code (CMAC).

21. A mobile computing device having at least one processor to:
- scan a near field communication (NFC) tag associated with an item to obtain a first unique identifier;
- use at least one imaging device to capture a quick response (QR) code to obtain a second unique identifier;
- transmit the first unique identifier and the second unique identifier to a server computing device; and
- transmit information associated with a particular user account to the server computing device to have the server computing device store an association between the particular user account and the item when the first unique identifier matches the second unique identifier and associate the item with a digital closet associated with the particular user account using JSON Web Token data.

* * * * *